UNITED STATES PATENT OFFICE.

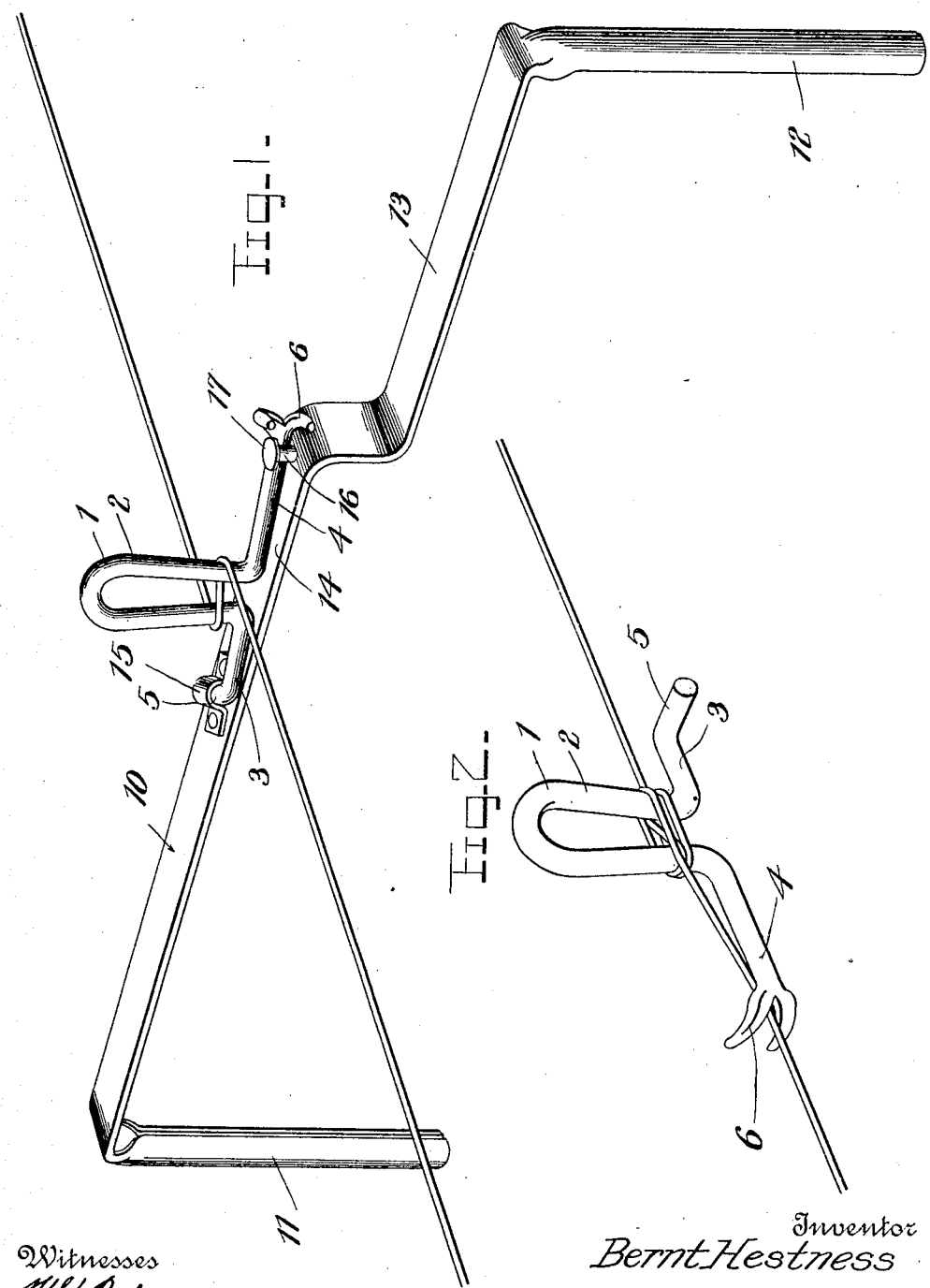

BERNT HESTNESS, OF ROCKFORD, WASHINGTON, ASSIGNOR OF ONE-HALF TO INGEBRET J. BLÄKKAN, OF ROCKFORD, WASHINGTON.

WIRE-STRETCHER.

No. 912,960.    Specification of Letters Patent.    Patented Feb. 16, 1909.

Application filed March 9, 1908. Serial No. 420,021.

*To all whom it may concern:*

Be it known that I, BERNT HESTNESS, a citizen of the United States, residing at Rockford, in the county of Spokane and State of Washington, have invented certain new and useful Improvements in Wire-Stretchers; and I do declare the following to be a full, clear, and exact description of the invention, such as will enable others skilled in the art to which it appertains to make and use the same.

This invention relates to improvements in wire stretchers and the object thereof is to provide a simply constructed and efficient device of this character.

With the foregoing and other objects in view, the invention consists of certain novel features of construction, combination and arrangement of parts, as will be more fully described and particularly pointed out in the appended claims.

In the accompanying drawings, Figure 1 is a perspective view of the device in operation; Fig. 2 is a similar view of the wire engaging member detached from the operating member and in position on the wire.

In the embodiment illustrated, this device comprises a wire engaging member 1 and an operating or tightening member 10.

The wire engaging member 1 as shown, is made in the form of a U-shaped loop 2 having lateral arms 3 and 4 at its free ends extending in opposite directions and the arm 3 has its terminal 5 bent laterally at right angles and is preferably made round to be engaged by the tightening or operating member as hereinafter described. The free end of the arm 4 is bent laterally at right angles in a direction opposite to the end 5 and is forked, as shown at 6 for a purpose to be described.

The operating or tightening member 10 is preferably made from a metal bar with its ends bent at right angles and extending in the same direction to form handles or gripping members 11 and 12. This member is preferably bent intermediately of the handle members to form an offset portion 13. The portion 14 of the bar is preferably provided near the bend therein which forms the offset, with a loop or eye 15 which preferably extends at an oblique angle to said bar and is designed to receive the rounded end 5 of the wire engaging member as hereinafter described. A stud 16 extends laterally from the portion 14 and adjacent the bend therein and is preferably provided with a head 17 to assist in retaining the forked end 6 of the member 1 in operative position.

In the use of this invention, the loop 2 of the member 1 is placed over the wire 7 to be stretched and the rounded end 5 is engaged with the eye of the member 10, and the forked end 6 engaged with the stud 16 of the member 10. The handles of the member 10 are then turned towards the operator to place them in a horizontal position with the wire resting in the loop of the member 1 near its base. The member 10 is then turned over and over which winds the wire around the loop 2 of the member 1 until the slack in said wire 7 is taken up and the wire stretched to the desired tension. The forked end 6 of the member 1 is then engaged with the wire and the member 10 is detached from the member 1 leaving the latter on the wire which securely holds it in stretched position. Should the wire again become loose, the operating member 10 is again engaged with the member 1 and the operation above described repeated. This wire stretcher can also be used to tighten ropes, clothes lines, guy ropes or wires for holding poles, smoke stacks, etc. by simply increasing the size as may be required for strength.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:—

1. A wire stretcher composed of a wire engaging member having arms extending laterally in opposite directions, the free ends of said arms being bent at right angles thereto and in opposite directions, one of said free ends being forked, and an operating member for said wire engaging member comprising a bar having laterally extending handles and provided with means for detachable engagement with the ends of the arms of the wire engaging member, the forked end of said wire engaging member being designed for engagement with the wire to hold it in operative position.

2. A wire stretcher composed of a wire engaging member in the form of a U-shaped loop having arms extending laterally from its free ends in opposite directions, the free ends of said arms being bent at right angles thereto and in opposite directions, one of said terminals being forked and the other rounded, and an operating member for said wire engaging member comprising a member having laterally extending handles and provided with an eye for detachable engagement with the round terminal of the wire engaging member, and a stud spaced from said eye for engagement with the forked end of said last mentioned member.

In testimony whereof I have hereunto set my hand in presence of two subscribing witnesses.

BERNT HESTNESS.

Witnesses:
  AMOS R. EATON,
  FRED ATHERTON.